United States Patent [19]

Harada

[11] Patent Number: 4,704,264

[45] Date of Patent: Nov. 3, 1987

[54] PROCESS FOR PRODUCTION OF SILANE

[75] Inventor: Junzo Harada, Sodegaura, Japan

[73] Assignee: Idemitsu Kosan Company Limited, Tokyo, Japan

[21] Appl. No.: 883,288

[22] Filed: Jul. 7, 1986

Related U.S. Application Data

[63] Continuation of Ser. No. 738,945, May 29, 1985, abandoned.

[30] Foreign Application Priority Data

Jun. 7, 1984 [JP] Japan .................................. 59-115480

[51] Int. Cl.$^4$ .............................................. C01B 33/04
[52] U.S. Cl. .................................... 423/347; 423/335; 423/344
[58] Field of Search ........................ 423/344, 347, 335

[56] References Cited

U.S. PATENT DOCUMENTS

| 2,551,571 | 5/1951 | Culbertson | 423/347 |
| 3,577,220 | 5/1971 | Kuratumi et al. | 423/347 |
| 4,605,542 | 8/1986 | Harada | 423/344 |

FOREIGN PATENT DOCUMENTS

| 6714708 | 8/1967 | Japan | 423/347 |
| 9098399 | 1/1973 | Japan | 423/347 |

OTHER PUBLICATIONS

Braver, Handbook of Preparative Inorganic Chemistry, 1963, p. 921.

Primary Examiner—John Doll
Assistant Examiner—Lori S. Freeman
Attorney, Agent, or Firm—Frishauf, Holtz, Goodman & Woodward

[57] ABSTRACT

A process for producing silane, which comprises forming a powdery mixture by mixing silica powder recovered from geothermal hot water with metallic magnesium powder, heating and reducing said powdery mixture to convert it to magnesium silicide and then reacting an organic acid with said magnesium silicide to produce silane and recovering said silane.

18 Claims, No Drawings

PROCESS FOR PRODUCTION OF SILANE

This application is a continuation of application Ser. No. 738,945, filed May 29, 1985, now abandoned.

BACKGROUND OF THE INVENTION

This invention relates to a process for producing silane, more particularly to a process for producing silane at low cost and high yield by use of silica recovered from geothermal hot water as the silica source.

Recently, the demand for polycrystalline silicon is increasing as the material for solar battery and semiconductor. Such a polycrystalline silicon is produced industrially according to, for example, the pyrolysis method in which monosilane is delivered into a pyrolysis furnace to be brought into contact with the surface of silicon core wire heated by current passage at 800° to 1000° C. to decompose and precipitate monosilane thereon (rod-shaped product) or the fluidized method in which monosilane is delivered into a fluidized-bed reactor filled with silicon particles of predetermined particle sizes to be pyrolyzed therein (powdery product).

Accordingly, in production of polycrystalline silicon, it is necessary to use silane as the starting material.

At present, the following processes for the production of silane are widely known (1) the so-called Siemens process wherein heating reduction treatment is applied to a mixture of silica and a carbon material in an arc furnace to produce metallic silicon, which metallic silicon is then halogenated into, for example, dichlorosilane, which dichlorosilane is subjected to disproportionation to produce silane and (2) the so called Stock process wherein silica is allowed to react with metallic magnesium to form magnesium silicide, which magnesium silicide is then reacted with an ammonium halide in liquid ammonia or an inorganic acid such as hydrochloric acid to produce silane.

The process (1), while having the advantage of producing a high purity silane, involves on the other hand the problem of including a diversity of complicated steps to make the production cost higher. In contrast, the process (2) poses a problem in low yield of silane (about 25%).

Thus, in representative processes for production of silane, the state of the art has not necessarily been satisfactory with respect to production cost and yield.

SUMMARY OF THE INVENTION

An object of the present invention is to provide a process which can produce silane at high yield and low cost.

The present inventor, in order to accomplish the above object, has made various investigations about the process (2) and found that the yield of silane becomes higher as compared with that of the prior art by use of silica contained in geothermal hot water in place of silica or quartz powder conventionally used as the silicon source for magnesium silicide, to accomplish the present invention.

More specifically, the process for producing silane of the present invention comprises mixing silica powder recovered from geothermal hot water with metallic magnesium powder, reducing by heating the resultant powdery mixture to convert it to magnesium silicide and then reacting an ammonium halide in liquid ammonia or an inorganic acid with said magnesium silicide.

DESCRIPTION OF PREFERRED EMBODIMENTS

The silicon source in the present invention is the silica recovered from geothermal hot water. The recovered silica can be obtained as follows. That is, geothermal hot water having a temperature of 200° C. or higher at the bowels of the earth and having a temperature of about 80° to 100° C. when taken from the earth, is left to stand stationary under room temperature. It is preferred to use geothermal hot water having a silica content of 200 to 1000 ppm. The time for stationary standing may be about one week. Silica particles exist in the colloidal state. Then, the colloidal solution is subject to ultra-filtration to concentrate the solid to about 20%, and the concentrate is dried by, for example, by spray drying to produce a powdered product at the same time. The particle size and the water content of the recovered silica depends on the conditions employed in these treatments, but it is generally preferred to utilize a particle size to 1 to 50 $\mu$m and water content of 1 to 50 wt. %, preferably 10 to 20 $\mu$m and 4 to 20 wt. %, respectively, in the process of the present invention.

The recovered silica obtained by the above method and metallic magnesium powder are mixed together. Magnesium employed should desirably be as pure as possible. The amount of metallic magnesium is 10 to 20% by weight greater than the calculated amount corresponding to magnesium silicide ($Mg_2Si$).

Subsequently, the powdery mixture is placed in a vessel containing no carbon (e.g. a boat made of iron), and the whole vessel is heated in a reducing atmosphere such as a hydrogen gas stream. The heating temperature is generally 400° to 800° C., preferably 500° to 600° C.

It is also possible to form the powdery mixture into pellets by a disc molding machine prior to the heating and reducing treatment.

Deep violet magnesium silicide is obtained. The magnesium silicide is placed in a gas generator such as a Kipp gas generator, and an ammonium halide in liquid ammonia or an inorganic acid such as hydrochloric acid is added dropwise thereinto, whereby silane gas comprising a mixture of $SiH_4$, $Si_2H_6$, $Si_3H_8$ will be generated with emission of white fume.

EXAMPLE

Geothermal water of about 100° C. and having a silica content of 500 ppm taken from a geothermal well was left to stand at room temperature for one week. The colloidal solution was filtered through an ultra-filtration membrane (trade name: Labomodule, produced by Asahi Kasei Kogyo K.K.) and silica components were recovered by spray drying. The silica recovered was found to have a primary particle size of 100 to 200 Å, with a composition of $SiO_2$ 96%, $Al_2O_3$ 0.5%, $Fe_2O_3$ 1.5%, $Na_2O$ 1% and CaO 1%.

One part by weight of the recovered silica was mixed with 2 parts by weight of matallic magnesium powder passed through the 100 mesh Tyler screen, and the resultant powdery mixture was molded in a stainless steel mold under a pressure of 600 Kg/cm². A tablet with a diameter of 30 mm and a thickness of about 6 mm was obtained.

The tablet thus obtained was placed in a crucible made of iron equipped with a lid and heated to 500° C. in an electric furnace under a stream of hydrogen. A deep violet porous spongy product was obtained.

The spongy product was cooled, placed in a Kipp gas generator and 1 N hydrochloric acid was added dropwise thereto. Silane gas was generated with emission of white fume. The amount of the silane gas generated was found to correspond to 66% of the silicon amount of the recovered silica.

For the purpose of comparison, magnesium silicide was produced in the same manner as described above except for using a quartz component with an average particle size of 5 μm. The amount of the silane gas generated from this material was found to correspond to 14% of the silicon amount of the starting material.

As can clearly be seen from the above description, according to the process of the present invention, there can be obtained such effects as (1) high yield of silane, (2) simple production step which enables reduction in production cost and (3) contribution to effective utilization of geothermal water, and its industrial value is great.

I claim:

1. A process for producing silane, which comprises forming a powdery mixture by mixing silica powder recovered from geothermal hot water with metallic magnesium powder, heating and reducing said powdery mixture to convert it to magnesium silicide and then reacting an inorganic acid with said magnesium silicide to produce silane and recovering said silane.

2. The process for producing silane according to claim 1, wherein said geothermal hot water has a silica content of 200 to 1000 ppm.

3. The process for producing silane according to claim 1, wherein the amount of said metallic magnesium powder is 10 to 20% by weight in excess of the stoichiometric amount required to form magnesium silicide.

4. The process for producing silane according to claim 1, wherein said heating is in a hydrogen gas atmosphere to provide a reducing atmosphere.

5. The process for producing silane according to claim 1, wherein said heating is conducted at a temperature of 400° to 800° C.

6. The process for producing silane according to claim 5, wherein said heating is conducted at a temperature of 500° to 600° C.

7. The process for producing silane according to claim 1, wherein said inorganic acid is hydrochloric acid.

8. The process for producing silane according to claim 1, wherein said silica powder recovered from said geothermal hot water has a particle size of 1 to 50 μm and a water content of 1 to 50 wt. %.

9. The process for producing silane according to claim 8, wherein said silica powder recovered from said geothermal hot water has a particle size of 10 to 20 μm and a water content of 4 to 20 wt. %.

10. The process for producing silane according to claim 2, wherein said heating is in a hydrogen gas atmosphere to provide a reducing atmosphere.

11. The process for producing silane according to claim 10, wherein the amount of said metallic magnesium powder is 10 to 20% by weight in excess of the stoichiometric amount required to form magnesium silicide.

12. The process for producing silane according to claim 11, wherein said heating is conducted at a temperature of 400° to 800° C.

13. The process for producing silane according to claim 12 wherein said inorganic acid is hydrochloric acid.

14. The process for producing silane according to claim 7, wherein said geothermal hot water has a silica content of 200 to 1000 ppm and the amount of said metallic magnesium powder is 10 to 20% by weight in excess of the stoichiometric amount required to form magnesium silicide.

15. The process for producing silane according to claim 4, wherein said silica powder recovered from said geothermal hot water has a particle size of 1 to 50 μm and a water content of 1 to 50 wt. %.

16. The process for producing silane according to claim 13, wherein said silica powder recovered from said geothermal hot water has a particle size of 1 to 50 μm and a water content of 1 to 50 wt. %.

17. The process for producing silane according to claim 11, wherein said inorganic acid is hydrochloric acid, said silica powder recovered from said geothermal hot water has a particle size of 1 to 50 μm and a water content of 1 to 50 wt. % and said heating is conducted at a temperature of 500° to 600° C.

18. The process for producing silane according to claim 17, wherein said silica powder recovered from said geothermal hot water has a particle size of 10 to 20 μm and a water content of 4 to 20 wt. %.

* * * * *